US012260504B2

(12) United States Patent
Buts et al.

(10) Patent No.: US 12,260,504 B2
(45) Date of Patent: Mar. 25, 2025

(54) SYSTEM AND METHOD FOR DYNAMIC PROVISIONING OF AUGMENTED REALITY INFORMATION

(71) Applicant: JPMorgan Chase Bank, N.A., New York, NY (US)

(72) Inventors: Alexander Buts, Vernon Hills, IL (US); Anitha Srinivasan, Plano, TX (US); Steven Weiner, Manhattan, NY (US); Tyrone Saunders, Houston, TX (US); Andrew Tayag Rodriguez, Edgewater, NJ (US); Jonathan Leach, Largo, FL (US); Eric Bikorimana, Newark, DE (US); Aniella Arantes, Jersey City, NJ (US); Rocky Maufort, Delaware, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 113 days.

(21) Appl. No.: 17/988,308

(22) Filed: Nov. 16, 2022

(65) Prior Publication Data

US 2024/0161415 A1    May 16, 2024

(51) Int. Cl.
*G06T 19/00* (2011.01)
*G06F 3/01* (2006.01)
*G06Q 30/0234* (2023.01)

(52) U.S. Cl.
CPC ............ *G06T 19/006* (2013.01); *G06F 3/011* (2013.01); *G06Q 30/0234* (2013.01)

(58) Field of Classification Search
CPC ..... G06T 19/006; G06T 7/74; G06T 2215/16; G06T 19/00; G06T 19/003; G06T 15/20; G06T 7/50; G06T 7/11
See application file for complete search history.

(56) References Cited

U.S. PATENT DOCUMENTS

| 10,726,473 B1 | 7/2020 | Graham et al. |
| 2006/0206376 A1 | 9/2006 | Gibbs et al. |

(Continued)

OTHER PUBLICATIONS

International Search Report dated Feb. 12, 2024 issued in International Application No. PCT/US2023/079094.

(Continued)

*Primary Examiner* — Ming Wu
(74) *Attorney, Agent, or Firm* — GREENBLUM AND BERNSTEIN, P.L.C.

(57) ABSTRACT

A method and system for performing dynamic provisioning of augmented reality information is provided. The method includes acquiring, from a user device of a user, user device-based information, retrieving rebate information corresponding to the user device-based information, and retrieving user information of the user of the user device. Based on the acquired and retrieved information, the method further tracks movement or activity of the user device, and determines whether a predetermined condition is met. When the predetermined condition is determined to have been met, the method displays one or more rebates in augmented reality over image information displayed on a display of the user device. However, when the predetermined condition is determined not to have been met, the method continues the tracking of movement or activity of the user device until the predetermined condition is determined to be met.

19 Claims, 12 Drawing Sheets

(56) References Cited

U.S. PATENT DOCUMENTS

| | | | |
|---|---|---|---|
| 2015/0073907 A1 | 3/2015 | Purves et al. | |
| 2015/0186985 A1* | 7/2015 | Alcott | G06Q 30/0643 |
| | | | 705/7.29 |
| 2018/0150903 A1* | 5/2018 | Waldron | G06F 3/011 |
| 2019/0371028 A1* | 12/2019 | Harrises | G06T 19/006 |
| 2020/0302510 A1 | 9/2020 | Chachek et al. | |
| 2021/0012577 A1 | 1/2021 | Stansell et al. | |
| 2021/0029780 A1* | 1/2021 | Vernon | H04W 40/24 |
| 2021/0337269 A1* | 10/2021 | Barnum | G06F 16/483 |
| 2023/0296906 A1* | 9/2023 | Hsiao | G02B 27/026 |
| | | | 345/7 |

OTHER PUBLICATIONS

Written Opinion dated Feb. 12, 2024 issued in International Application No. PCT/US2023/079094.

* cited by examiner

SYSTEM AND METHOD FOR DYNAMIC PROVISIONING OF AUGMENTED REALITY INFORMATION

TECHNICAL FIELD

This disclosure generally relates to a system and method for dynamically provisioning augmented reality information based on user device-based information.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Rebate programs, as presently being offered, are not user friendly and requires research and planning beforehand to learn about one or more existing rebates prior to shopping. As research and planning is performed for existing rebates, a found rebate may drive user behavior. If available rebates are not planned beforehand, the rebate will not be acquired for use at a corresponding location, even if a rebate may be available for use. Further, a user may be even unaware of any available rebates or promotions available at a retailer or store a user may be visiting until it is searched after the visit to the respective retailer or store. Accordingly, distribution of rebate or promotional information is not as effective.

SUMMARY

According to an aspect of the present disclosure, a method for performing dynamic provisioning of augmented reality information is provided. The method includes performing, using a processor and a memory: acquiring, from a user device of a user, user device based information; retrieving rebate information corresponding to the user device based information; retrieving user information of the user of the user device; tracking movement or activity of the user device; determining whether a predetermined condition is met; when the predetermined condition is determined to have been met, displaying one or more rebates in augmented reality over image information displayed on a display of the user device; and when the predetermined condition is determined not to have been met, continue the tracking of movement or activity of the user device until the predetermined condition is determined to be met.

According to another aspect of the present disclosure, the user device-based information is image information captured by the user.

According to another aspect of the present disclosure, the user device-based information is location information.

According to yet another aspect of the present disclosure, the user device-based information is map information.

According to another aspect of the present disclosure, the method further includes determining availability of a special reward corresponding to the one or more rebates; after determining that the predetermined condition has been met, tracking user actions; and determining whether an activation condition for the special reward has been met based on the user actions, in which the predetermined condition is a predetermined distance of a location of the user device.

According to a further aspect of the present disclosure, the activation condition is a performance of predetermined user movements.

According to yet another aspect of the present disclosure, the activation condition is speaking of a certain phrase.

According to a further aspect of the present disclosure, the activation condition includes being located at a predetermined area.

According to another aspect of the present disclosure, the method further includes receiving a selection of a rebate among the one or more rebates displayed in augmented reality; and generating a travel path to a retailer location corresponding to the rebate selected.

According to a further aspect of the present disclosure, the method further includes determining whether a purchase was made at a retailer corresponding to the one or more rebates in augmented reality; and when the purchase is determined to have been made at the retailer corresponding to the one or more rebates in augmented reality: applying applicable rebate, and permitting a review of the purchase made.

According to a further aspect of the present disclosure, the method further includes determining whether a purchase was made at a retailer corresponding to the one or more rebates in augmented reality; and when the purchase is determined not to have been made at the retailer corresponding to the one or more rebates in augmented reality, update user information based on non-purchase.

According to a further aspect of the present disclosure, the method further includes applying one or more artificial intelligence (AI) or machine learning (ML) based on whether the purchase was made at the retailer for provisioning of future rebate offerings via augmented reality.

According to a further aspect of the present disclosure, the displayed image information is a map.

According to a further aspect of the present disclosure, the displayed image information is an image of one or more retailers corresponding to the one or more rebates.

According to a further aspect of the present disclosure, the displayed image information is an image of an area including one or more retailers corresponding to the one or more rebates.

According to a further aspect of the present disclosure, the method further includes displaying product offerings provided by a retailer corresponding to the one or more rebates.

According to a further aspect of the present disclosure, the method further includes displaying a review for a retailer corresponding to the one or more rebates.

According to a further aspect of the present disclosure, the method further includes displaying a moving virtual object in augmented reality corresponding to the one or more rebates, in which the moving virtual object guides the user to a retailer corresponding to the one or more rebates.

According to another aspect of the present disclosure, a system for performing dynamic provisioning of augmented reality information is disclosed. The system includes a user device of a user; and a server including at least a memory and a processor. The processor is configured to perform: acquire, from the user device, user device-based information; retrieve rebate information corresponding to the user device-based information; retrieve user information of the user of the user device; track movement or activity of the user device; determine whether a predetermined condition is met; when the predetermined condition is determined to have been met, display one or more rebates in augmented reality over image information displayed on a display of the user device; and when the predetermined condition is determined not to have been met, continue to track the movement or activity of the user device until the predetermined condition is determined to be met.

According to another aspect of the present disclosure, a non-transitory computer readable storage medium that stores a computer program for performing dynamic provisioning of augmented reality information is disclosed. The computer program, when executed by a processor, acquiring, from a user device of a user, user device based information; retrieving rebate information corresponding to the user device based information; retrieving user information of the user of the user device; tracking movement or activity of the user device; determining whether a predetermined condition is met; when the predetermined condition is determined to have been met, displaying one or more rebates in augmented reality over image information displayed on a display of the user device; and when the predetermined condition is determined not to have been met, continue the tracking of movement or activity of the user device until the predetermined condition is determined to be met.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
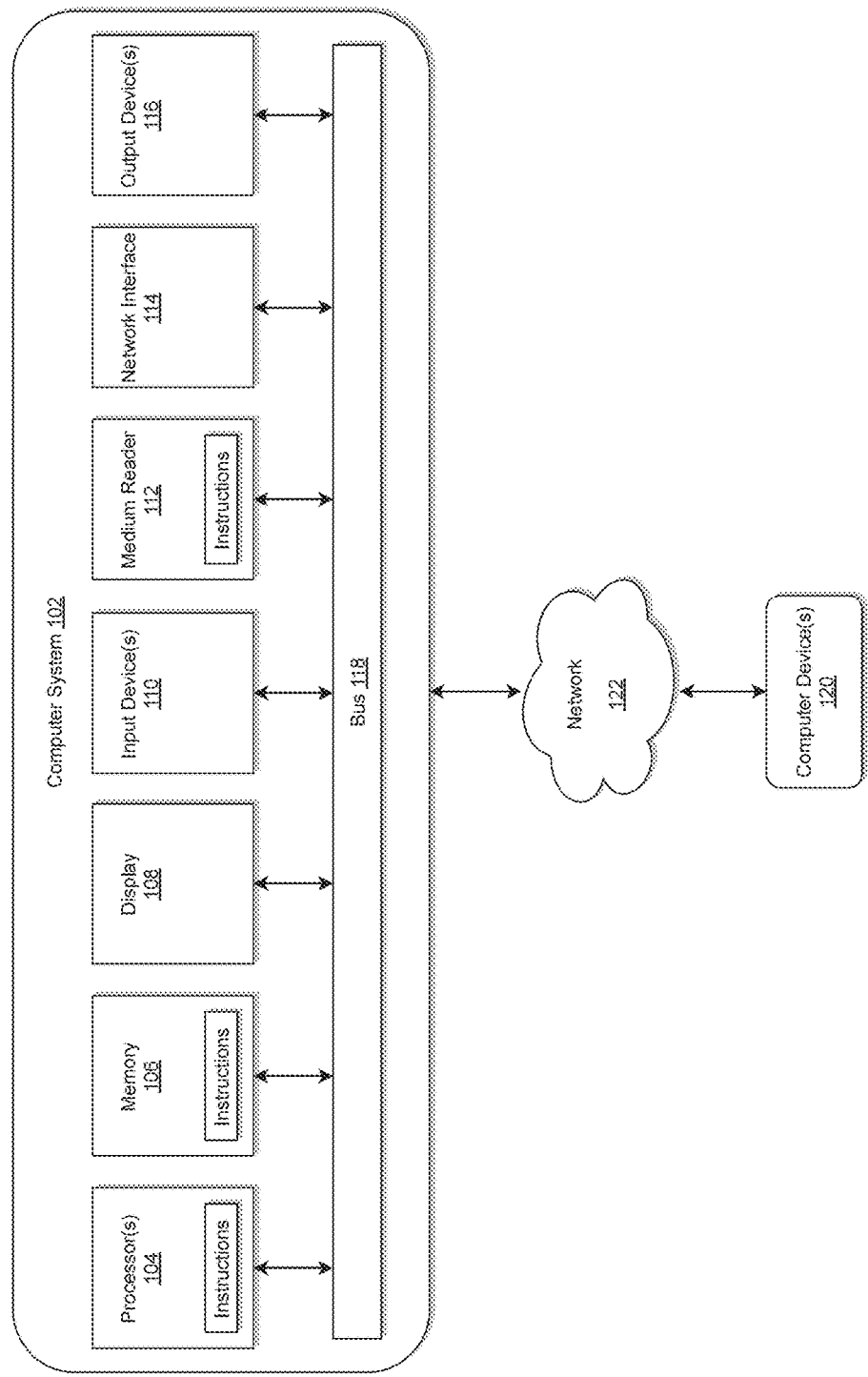
FIG. 1 illustrates a computer system for implementing a dynamic augmented reality provisioning system (DARPS) in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a dynamic augmented reality provisioning system (DARPS) in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such a cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
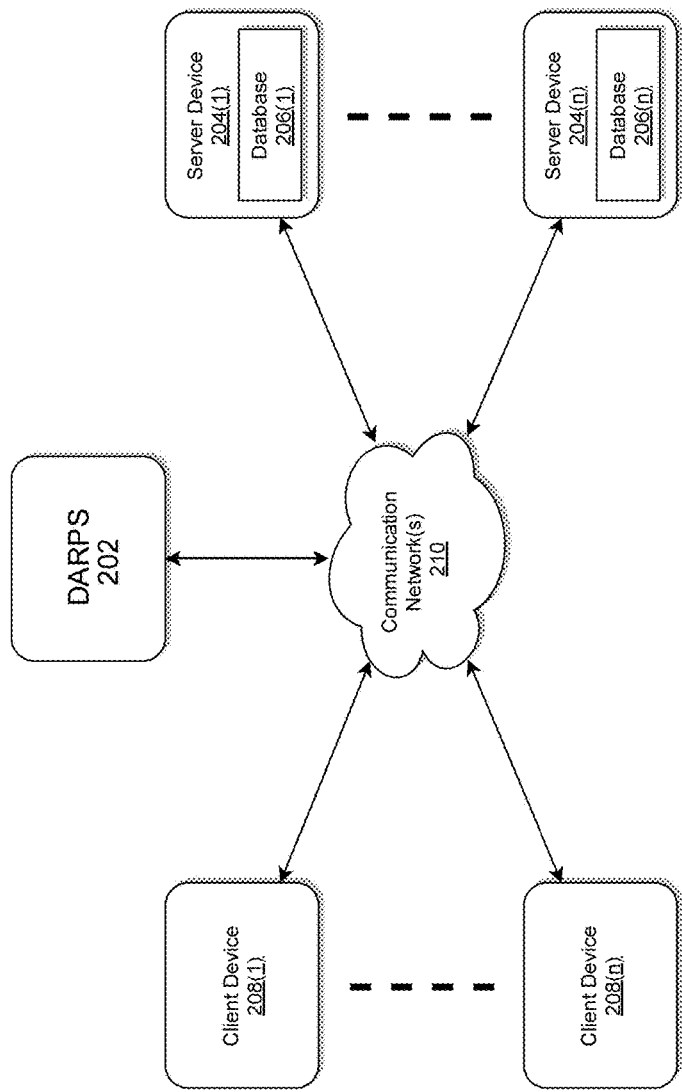
FIG. 2 illustrates an exemplary diagram of a network environment with a DARPS in accordance with an exemplary embodiment.

FIG. 2 illustrates an exemplary diagram of a network environment with a DARPS in accordance with an exemplary embodiment.

A DARPS 202 may be implemented with one or more computer systems similar to the computer system 102 as described with respect to FIG. 1.

The DARPS 202 may store one or more applications that can include executable instructions that, when executed by the DARPS 202, cause the DARPS 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the DARPS 202 itself, may be located in virtual server(s) running in a cloud-based computing environment rather than being tied to one or more specific physical network computing devices. Also, the application(s) may be running in one or more virtual machines (VMs) executing on the DARPS 202. Additionally, in one or more embodiments of this technology, virtual machine(s) running on the DARPS 202 may be managed or supervised by a hypervisor.

In the network environment 200 of FIG. 2, the DARPS 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the DARPS 202, such as the network interface 114 of the computer system 102 of FIG. 1, operatively couples and communicates between the DARPS 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DARPS 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DARPS 202 may be a standalone device or integrated with one or more other devices or apparatuses, such as one or more of the server devices 204(1)-204(n), for example. In one particular example, the DARPS 202 may be hosted by one of the server devices 204(1)-204(n), and other arrangements are also possible. Moreover, one or more of the devices of the DARPS 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DARPS 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) host the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DARPS 202 that may efficiently provide a platform for implementing a cloud native DARPS module, but the disclosure is not limited thereto.

The client devices 208(1)-208(n) may run interface applications, such as standard web browsers or standalone client applications, which may provide an interface to communicate with the DARPS 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DARPS 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DARPS 202, the server devices 204(1)-204(n), or the client devices 208(1)-208(n), for example, may be configured to operate as virtual instances on the same physical machine. For example, one or more of the DARPS 202, the server devices 204(1)-204(n), or the client devices 208(1)-208(n) may operate on the same physical device rather than as separate devices communicating through communication network(s) 210. Additionally, there may be more or fewer DARPS 202, server devices 204(1)-204(n), or client devices 208(1)-208 (n) than illustrated in FIG. 2. According to exemplary embodiments, the DARPS 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
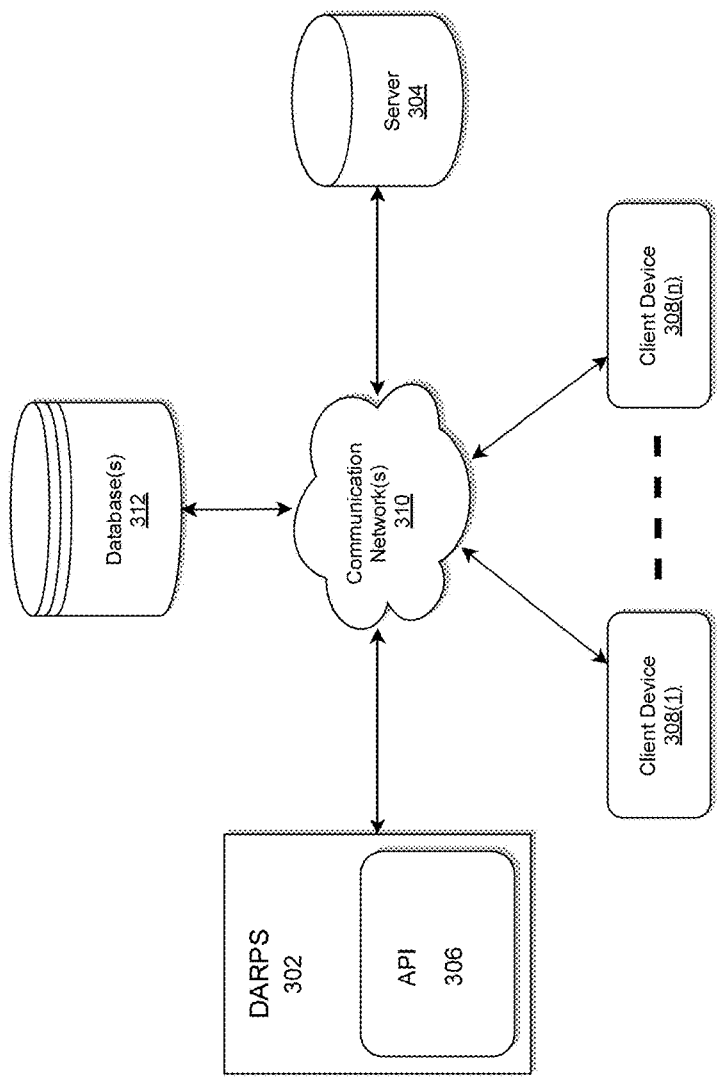
FIG. 3 illustrates a system diagram for implementing a DARPS in accordance with an exemplary embodiment.

FIG. 3 illustrates a system diagram for implementing a DARPS in accordance with an exemplary embodiment.

As illustrated in FIG. 3, the system 300 may include a DARPS 302 within which a group of API modules 306 is embedded, a server 304, a database(s) 312, a plurality of client devices 308(1) . . . 308(n), and a communication network 310.

According to exemplary embodiments, the DARPS 302 including the API modules 306 may be connected to the server 304, and the database(s) 312 via the communication network 310. Although there is only one database that has been illustrated, the disclosure is not limited thereto. Any number of databases may be utilized. The DARPS 302 may also be connected to the plurality of client devices 308(1) . . . 308(n) via the communication network 310, but the disclosure is not limited thereto.

According to exemplary embodiment, the DARPS 302 is described and shown in FIG. 3 as including the API modules 306, although it may include other rules, policies, modules, databases, or applications, for example. According to exemplary embodiments, the database(s) 312 may be embedded within the DARPS 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable DARPS as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the DARPS 302. In this regard, the plurality of client devices 308(1) . . . 308(n) may be "clients" of the DARPS 302 and are described herein as such. Nevertheless, it is to be known and understood that the plurality of client devices 308(1) . . . 308(n) need not necessarily be "clients" of the DARPS 302, or any entity described in association therewith herein. Any additional or alternative relationship may exist between either or both of the plurality of client devices 308(1) . . . 308(n) and the DARPS 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DARPS 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DARPS 302 may be the same or similar to the DARPS 202 as described with respect to FIG. 2, including any features or combination of features described with respect thereto.

Figure 4A:
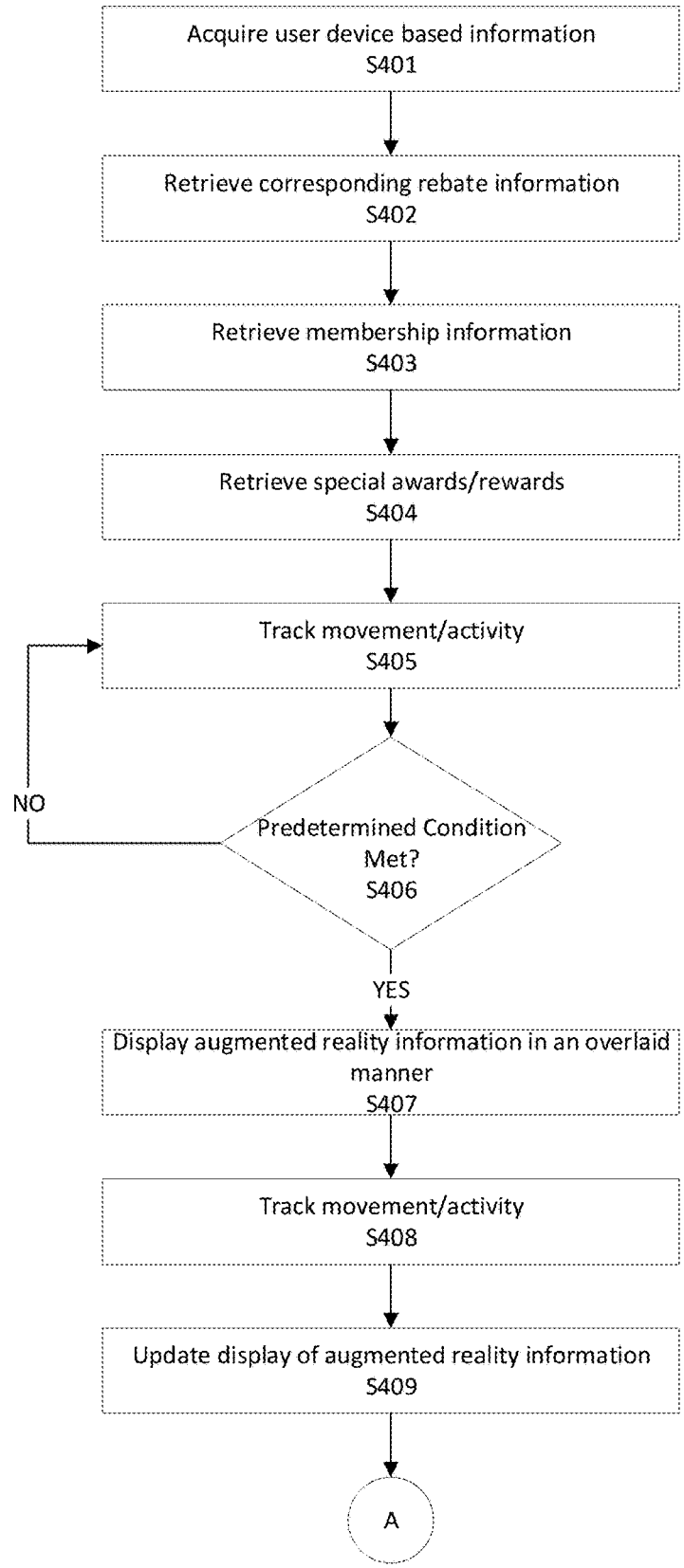
FIGS. 4A-4B illustrate a method for dynamically provisioning augmented reality information based on user device information in accordance with an exemplary embodiment.
Figure 4B:
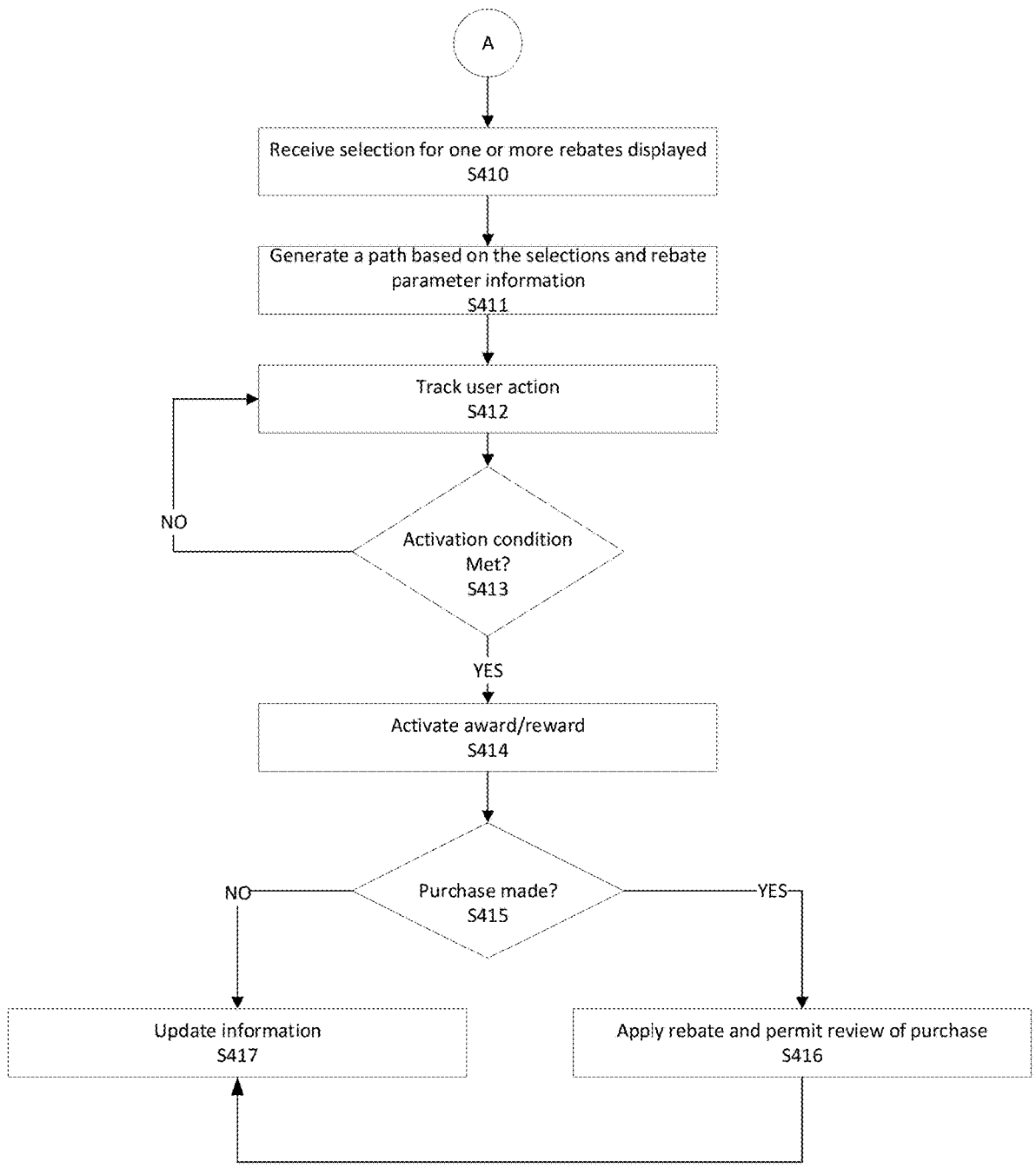

FIGS. 4A-4B illustrate a method for dynamically provisioning augmented reality information based on user device information in accordance with an exemplary embodiment. FIGS. 5A-5G illustrate provisioning of augmented reality information in accordance with an exemplary embodiment.

In operation S401, user device information is acquired from a user device of a user by a server over a network. According to exemplary aspects, user device information may include, without limitation, a location of the user device, image acquired by the user device, map information displayed on the user device and any information related to the user device. For example, the image acquired by the user device may be an image captured in real-time or an image captured beforehand. Further, in an example, the location of the user device may be determined using a GPS signal, by location triangulation and the like. According to exemplary aspects, a user device may include, without limitation, a mobile terminal (e.g., smart phone, tablet, a personal digital assistant, a mobile computing device and the like) and wearable computing devices (e.g., augmented reality eyewear, smart watch, and the like.

In operation S402, rebate information corresponding to the user device information is retrieved. According to exemplary aspects, the rebate information may include a percentage or an amount of a purchase amount that may be provided back to the user, reward points, a coupon for current or future purchase, and the like. Although rebate information is disclosed herein, aspects of the present disclosure are not limited thereto, such that other promotional/marketing information may be retrieved for provisioning in augmented reality. Moreover, the rebate information may additionally include, without limitation, text-based information, image information, video information, holograph, moving images (e.g., two dimensional or three dimensional), time limitation, and the like.

In operation S403, membership information is retrieved. In an example, a membership corresponding to a retailer and/or payment form for which the rebate information is retrieved may be obtained. For example, the membership information may include, without limitation, membership profile, biographic information, loyalty/membership points collected, prior purchase information, and the like.

In operation S404, special reward or award opportunity is retrieved, if available. According to exemplary aspects, additional or special reward or award may be promotionally provided to a user performing certain actions or movements or certain songs. Further, special reward or award may be promotionally provided to a user stating a certain phrase or making a certain gesture. In an example, the performance of certain actions, songs or movements may be specified by a retailer. The performance of such acts may be specified to be performed at a certain location or venue. For example, additional or special reward or award may be provided to a user for performing a Super Mario punch action in front of a video game retailer or by making a particular gesture specified by a retailer. In another example, additional or special reward or award may be provided to a user singing a specified song (e.g., commercial jingle) or stating a specified phrase (e.g., brand related phrases). In yet another example, additional or special reward or award may be provided to a user playing a specified song (e.g., Saria's Song) on ocarina.

Further, availability of special reward or award may be provided in a different form (e.g., different color, different banner or the like) from the rebate information. However, aspects of the present disclosure are not limited thereto, such that this operation may not be performed if no special reward or award opportunity exists for the retailer.

In operation S405, movement or activity performed with the user device is monitored. According to exemplary aspects, a movement of the user device may be tracked with an accelerometer or camera included in the user device, based on location information (e.g., GPS information, location triangulation, or the like) or the other location or movement tracking technology. In an example, the movement or activity performed with the user device may include a movement along a certain path or area, or a performance of a certain act. However, aspects of the present disclosure are not limited thereto, such that the movement of the user device may also be tracked using data from external cameras.

In operation S406, while tracking the movement or activity performed with the user device in operation S405, a determination of whether a predetermined condition is met is made. According to exemplary aspects, if the user device is detected to be within a predetermined distance of a retailer for which rebate information is retrieved, the predetermined condition may be determined to have been met. According to further aspects, the predetermined condition may specify that the rebate information corresponds to the retrieved membership information. For example, if the rebate information is specific to a certain credit card, the rebate information may be provided only if the membership information specifies that the user has the certain credit card. Alternatively, if the membership information specifies that the user does not have the certain credit card, the rebate information may be provided along with an option to sign up for the certain credit card. Further, if the user device is detected to perform a certain activity, it may be further determined that a predetermined condition for displaying the special reward or award earned has also been met. According to exemplary aspects, the predetermined condition may be system specified, user specified or retailer specified.

If the predetermined condition is determined not to have been met, the method proceeds back to operation S405 for continually tracking movement or activity performed with the user device. On the other hand, if the predetermined condition is determined to have been met, the method proceeds to operation S407 for displaying augmented reality information in an overlaid manner. According to exemplary aspects, augmented reality information may be displayed over an image provided on a display of the user device. In an example, the image provided on the display of the user device may include an image captured via a camera of the user device or a corresponding device. According to further aspects, augmented reality may be provided in a text format, an image format (e.g., still or moving), a video format, a holograph format, or the like. In addition, augmented reality may be provided on a single or multiple window or panes and the like. For example, augmented reality may be provided as a virtual object (e.g., virtual ninja character) that runs towards a store (e.g., a comic book store) offering a rebate.

Figure 5A:
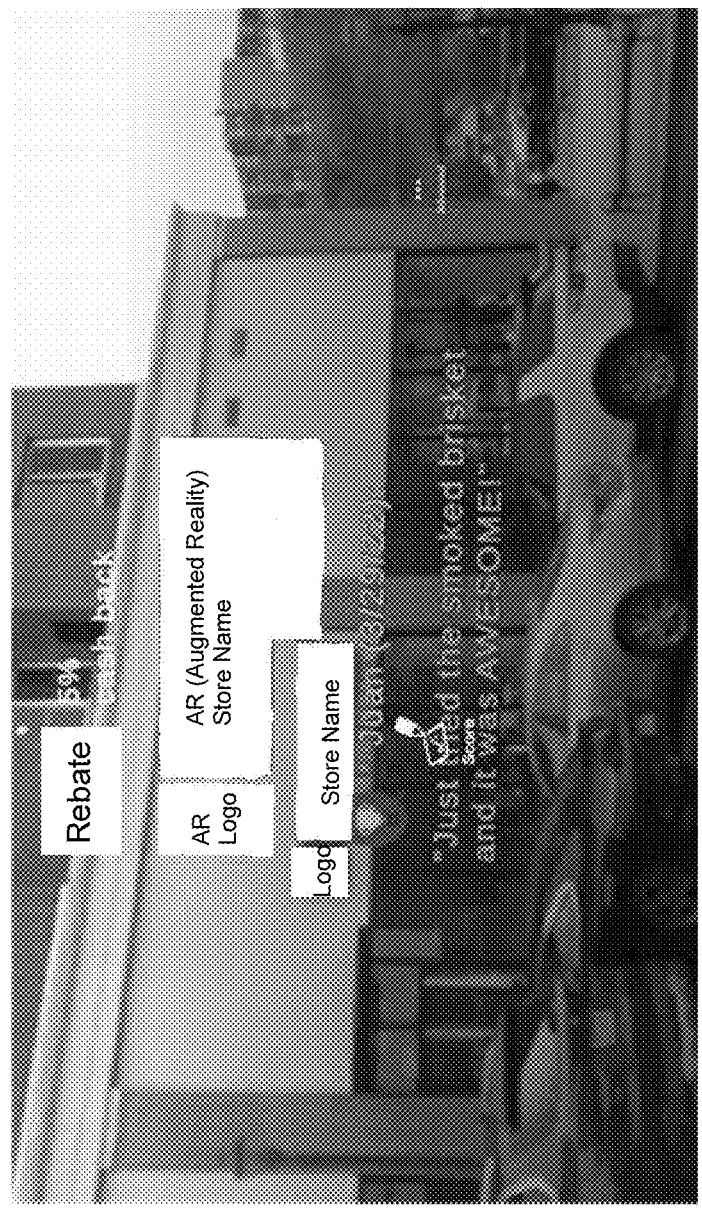
FIGS. 5A-5G illustrate provisioning of augmented reality information in accordance with an exemplary embodiment.

For example, as illustrated in FIG. 5A, when a user device is determined to be within a predetermined distance of a retailer having corresponding rebate or other promotional information, the rebate or the promotional information may be displayed in augmented reality on a display of the user device. Further, in an example, the display of the augmented reality information may be preceded by a notification of the rebate availability if a display of the user device is in an off-state. As illustrated, shown in FIG. 5A, rebate information along with a retailer's logo along with review information may be provided over a real-world image of the respective retailer.

Figure 5B:

Alternatively, the rebate or the promotional information may be displayed in augmented reality on a display of the user device when a name or logo of the retailer is captured by a camera of the user device. For example, the user device may perform image recognition on the words or logos captured by the user device and retrieve corresponding rebate or promotional information for display in augmented reality. In an example, the user device may perform image recognition based on the entirety of the retailer's name as illustrated in FIG. 5A or based on a partial image of the retailer's name as illustrated in FIG. 5B. Further, as illustrated in FIG. 5B, the augmented reality information may be located on a different part of the display to provide simultaneous view of the real-world image of the retailer's name or logo and corresponding augmented reality information. According to exemplary aspects, image recognition performed may identify a location of the retailer's name on a displayed image, and provide the corresponding augmented reality information on a location of the display that will not block display of the real-word image.

Figure 5C:
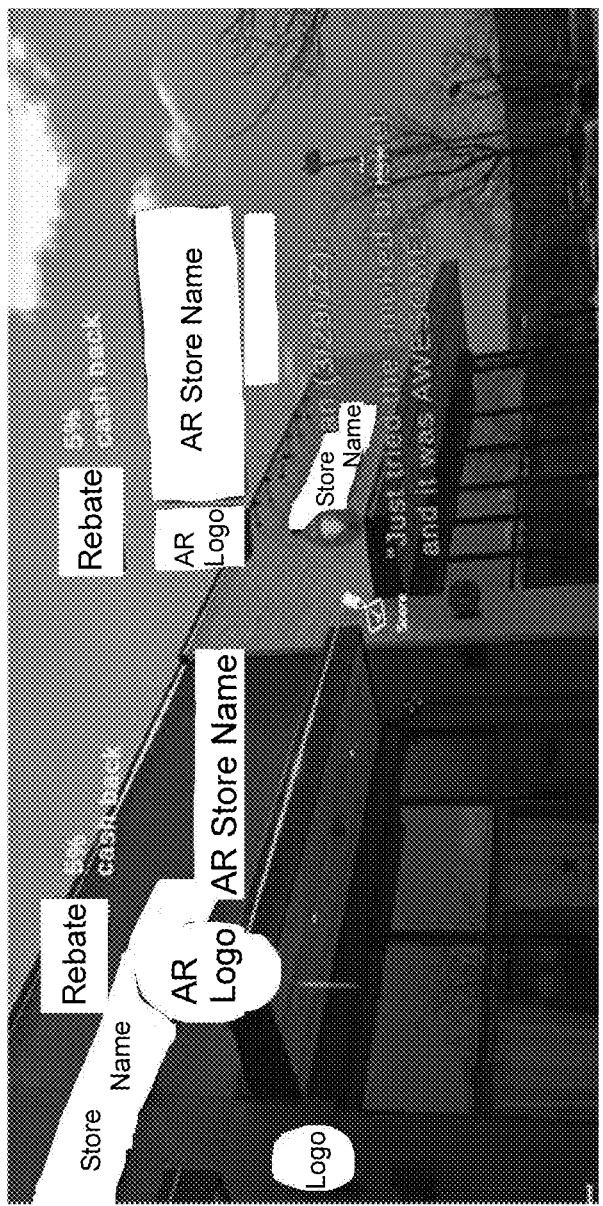

Further to the above, multiple businesses with rebate information may be recognized and displayed simultaneously as illustrated in FIG. 5C.

Figure 5D:
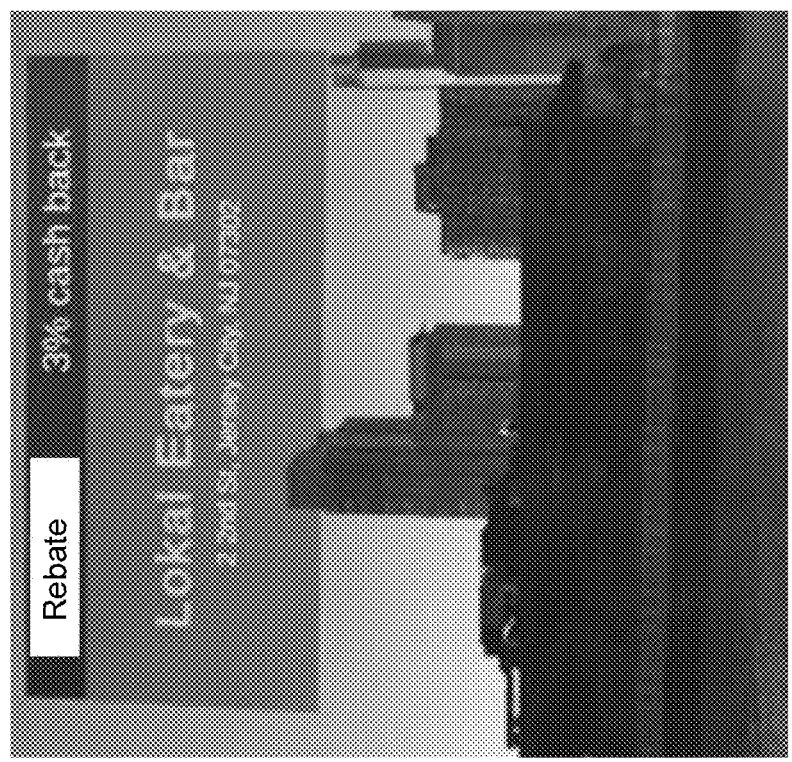

However, aspects of the present disclosure are not limited thereto, such that rebate information or promotional information may be displayed without presence of a retailer's name or logo. As illustrated in FIG. 5D, an image of certain location or landmarks may be sufficient to identify retailers within a predetermined range that may be associated with rebate or promotional offers. Identification of the retailer along with other relevant information (e.g., address, hours of operation, phone number and the like) may be displayed in augmented reality. Moreover, a display of the rebate or promotional information in augmented reality may be triggered when the user device is determined to be traveling towards a particular area (e.g., city, shopping center, tourist attraction, hotel, or other areas of interest).

Figure 5E:
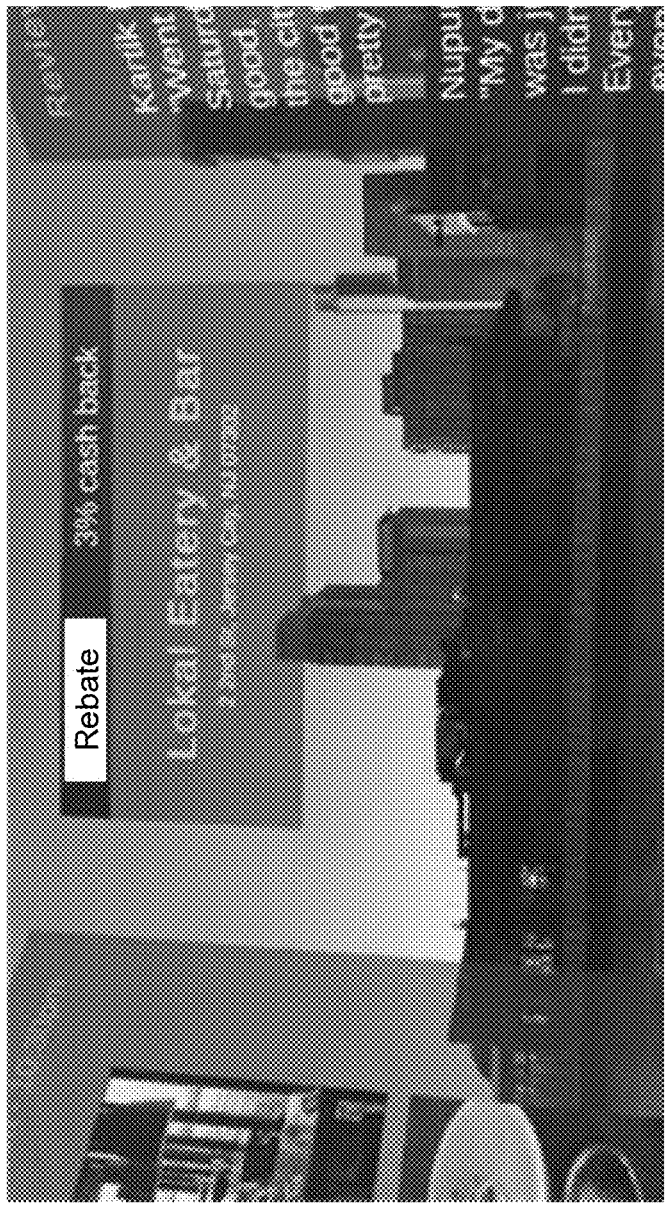

In addition to the above, additional information corresponding to the retailer may also be displayed in augmented reality. As exemplarily illustrated in FIG. 5E, information related to the retailer may be displayed along with the rebate information in multiple panels of information. According to exemplary aspects, display of the corresponding information may be initiated contemporaneously with the rebate or promotional information. Alternatively, the corresponding information may be displayed in response to a selection of a corresponding rebate or promotion displayed in augmented reality. As illustrated in FIG. 5E, information related to the retailer may include, recent reviews that may be displayed in one panel of the augmented reality information, while images of the restaurant or dishes served by the restaurant along with hour of operation may be displayed on another panel. However, aspects of the present disclosure are not limited thereto, such that additional information may be provided and augmented reality information may be displayed in any suitable manner.

Figure 5F:
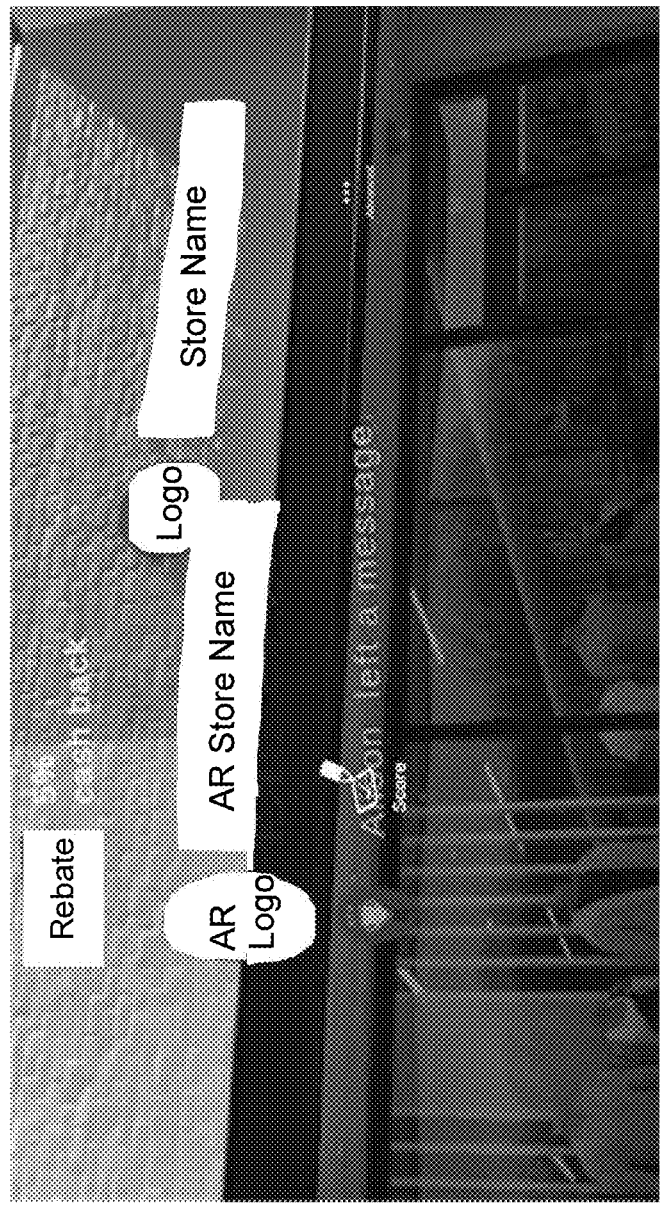

As illustrated in FIG. 5F, augmented reality generated information for a retailer may also indicate presence of a message directed to a user. In an example, the message may be generated by an employee, a friend or contact, a member of a social group or the like. Further, the message may include a review or recommendation of the store, a particular item or the like. Moreover, the message may additionally include a transferable promotion, points, virtual item or the like.

Figure 5G:
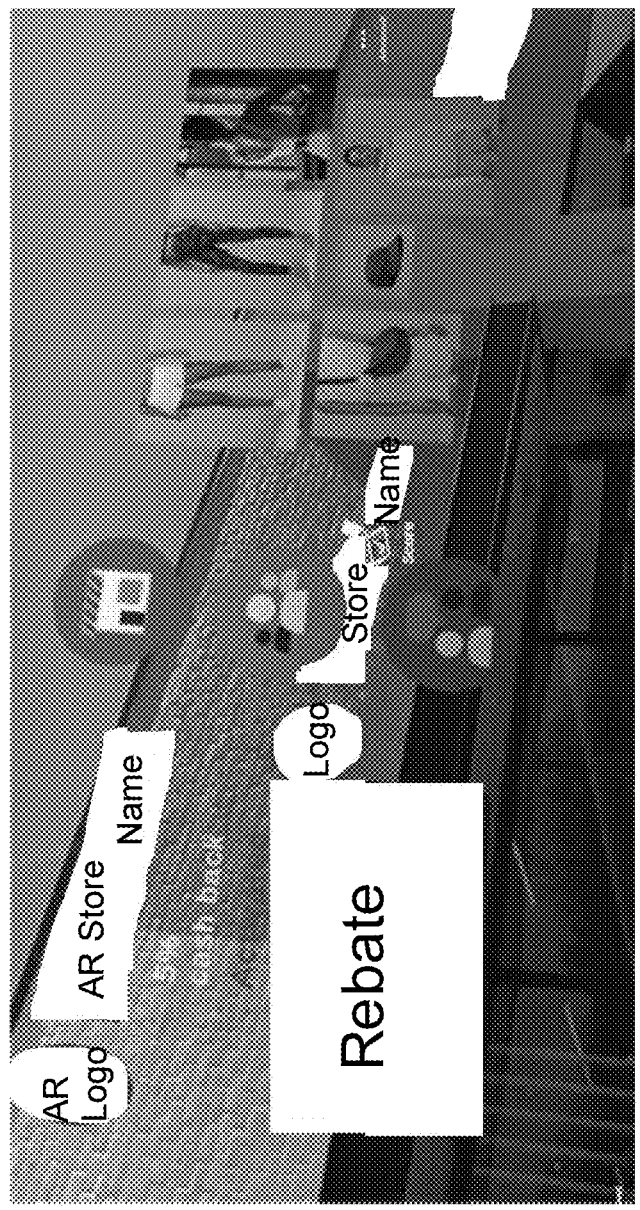

Also, as illustrated in FIG. 5G, augmented reality generated information may provide rebate information along with various images of products for purchase. In an example, the various images may indicate popular items, recently sold items, or items that may be selectively picked out for the user based on previous shopping history using one or more artificial intelligence (AI) or machine learning (ML) algorithms. Further, options for sending or leaving a message, managing social network, and visiting the retailer's online store may be provided for selection.

In operation S408, movement or activity performed with the user device is monitored. For example, a movement or an activity performed may include walking closer to the retailer or walking into a particular store, performing an activity specified for obtaining the special reward/award, or the like.

In operation S409, augmented reality information may be updated based on the movement or activity performed in operation S408. For example, if the movement or activity performed indicates that the user device has entered into retailer A, augmented reality information for other retailers may be removed from display. Further, additional information for the retailer A may be provided. For example, reviews, promotional items, availability of special reward(s) or award(s) along with conditions for obtaining them, and the like.

In operation S410, selection(s) of one or more rebates that are displayed is received. For example, among retailers in a predetermined radius of the user (e.g., 0.5 mile) offering rebates, selections of one or more rebates may be detected. According to exemplary aspects, upon receipt of such selections, unselected rebate information may be temporarily hidden from view. Alternatively, the selected rebate offerings may be highlighted, and/or the unselected rebate offerings may be grayed out. However, aspects of the present disclosure are not limited thereto, such that any method of display to show distinction between selected and unselected retailers may be utilized.

In operation S411, a path may be generated based on the selection information received in operation S410. According to exemplary aspects, the path may be generated based on shortest distance, ease of path, density of people along the path, locations of local landmarks or other popular places, and the like. Moreover, the path may be generated for multiple selections. For example, the path may be generated based on priority set by the user, inventory level of promotional items, expiration time of rebate, a preferred route or the like.

In operation S412, movement or activity is tracked. According to exemplary aspects, the movement or activity may be tracked based on location information of the user device being operated or worn by the user. In an example, the user device may include, without limitation, a mobile terminal, a smart watch, augmented reality glasses, other wearable electronics and the like. Movement or activity being tracked may include, without limitation, direction of travel, pace of travel, number of steps taken, one or more body movements, heart rate, other biometric information, and the like.

In operation S413, it is determined whether an activation condition for an award or reward has been met or not. According to exemplary aspects, an activation condition may include, without limitation, walking into a particular store or retailer, saying a particular phrase, performing a specified act (e.g., performing a specific movement) within a predetermined distance of the respective store or retailer, using a particular payment form, using a loyalty membership, or the like. However, aspects of the present disclosure are not limited thereto, such that any activation condition may be specified by a retailer or a partnering organization. Moreover, this step may not be performed if an award or reward is not being offered.

If the activation condition is determined to not have been met in operation S413, the method proceeds back to operation to S412. On the other hand, if the activation condition is determined to have been met in operation S413, a specified award or reward is activated or generated for presentation to the user in operation S414. According to exemplary aspects, the award or reward may be in physical or digital form, and may be specified or provided by a retailer or a partnering organization. In an example, the reward or award may be provided independent of purchase at a particular retailer, or may be provided only upon purchase from the particular retailer. Such requirements may be specified by a respective retailer or by a system administrator.

In operation S415, it is further determined whether a purchase is made for application of the rebate specified in the rebate information. If it is determined that the user did not make an eventual purchase, user information is updated in operation S417 to reflect the visit to the retailer offering the rebate and disinterest by the user. Based on aggregation of such information, one or more artificial intelligence (AI) or machine learning (ML) algorithms may be applied to providing user tailored rebate information. For example, AI or ML algorithms may determine that a particular user is interested in a certain type of retailers and not others, and may adjust display of augmented reality information accordingly. In an example, certain rebate information may be hidden from view, and adjusted in how they are displayed (e.g., larger text, highlighting, different borders, shading of text and etc.). Further, AI or ML algorithms may be utilized to provide differentiated offerings to users. For example, larger promotions or differentiated awards/rewards may be offered to different users based on a user's shopping history, value to retailer, timing of last purchase, and the like.

Generally, AI or ML algorithms may be executed to perform data pattern detection, and to provide an output or render a decision based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. A machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, k-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

On the other hand, if purchase at the retailer offering the rebate is determined to have been made in operation S415, the user is then permitted to input a review of the user's experience for display on augmented reality in operation S416. The review may be automatically fed to the user's social connections or group. Further, user information or profile may be updated to reflect the purchase and corresponding rebate and award/reward for tailoring of future rebate or award/reward offerings to the user using one or more AI or ML algorithms.

Further, once the rebate is applied and review of purchase is permitted in operation S416, the method proceeds to operation S417 to reflect the purchase at the retailer offering the rebate. Based on aggregation of such information, one or more AI or ML algorithms may be applied to providing user tailored rebate information. For example, AI or ML algorithms may determine that a particular user is interested in certain types of retailers and not others, and may adjust display of augmented reality information accordingly. In an example, certain rebate information may be promoted, highlighted or adjusted in how they are displayed (e.g., larger text, highlighting, different boarders, shading of text and etc.). Further, AI or ML algorithms may be utilized to provide differentiated offerings to users. For example, larger promotions or differentiated awards/rewards may be offered to different users based on user's shopping history, value to retailer, timing of last purchase, and the like.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing dynamic provisioning of augmented reality information, the method comprising:
   acquiring, from a user device of a user, user device-based information;
   retrieving rebate information corresponding to the user device-based information;
   retrieving user information of the user of the user device;
   tracking a movement and activity of the user device, wherein the activity of the user device includes performance of a certain physical act tracked using an accelerometer included in the user device, and wherein the tracking of the movement of the user device includes tracking a location of the user device along a certain path using a global positioning system (GPS) information of the user device;

determining whether a predetermined condition is met;

when the predetermined condition is determined to have been met, displaying one or more rebates in augmented reality over image information displayed on a display of the user device;

when the predetermined condition is determined not to have been met, continue the tracking of the movement and activity of the user device until the predetermined condition is determined to be met;

displaying a moving virtual character in a holograph format corresponding to the one or more rebates, wherein the moving virtual character runs towards a physical retailer location corresponding to the one or more rebates; and based on the movement and activity of the user device, removing from the display of the user device, at least one rebate corresponding to at least one retailer while additional augmented reality information corresponding another retailer is displayed.

2. The method according to claim 1, wherein the user device-based information is image information captured by the user.

3. The method according to claim 1, wherein the user device-based information is location information.

4. The method according to claim 1, wherein the user device-based information is map information.

5. The method according to claim 1, further comprising:
determining availability of a special reward corresponding to the one or more rebates;
after determining that the predetermined condition has been met, tracking user actions; and
determining whether an activation condition for the special reward has been met based on the user actions,
wherein the predetermined condition is a predetermined distance of the location of the user device, and
wherein the activation condition includes a user singing a specified song.

6. The method according to claim 5, wherein the activation condition further includes a performance of predetermined user movements.

7. The method according to claim 5, wherein the activation condition further includes speaking of a certain phrase.

8. The method according to claim 5, wherein the activation condition further includes being located at a predetermined area.

9. The method according to claim 1, further comprising:
receiving a selection of a rebate among the one or more rebates displayed in augmented reality; and
generating a travel path to a retailer location corresponding to the rebate selected.

10. The method according to claim 1, further comprising:
determining whether a purchase was made at a retailer corresponding to the one or more rebates in augmented reality; and
when the purchase is determined to have been made at the retailer corresponding to the one or more rebates in augmented reality:
applying applicable rebate, and
permitting a review of the purchase made.

11. The method according to claim 1, further comprising:
determining whether a purchase was made at a retailer corresponding to the one or more rebates in augmented reality; and
when the purchase is determined not to have been made at the retailer corresponding to the one or more rebates in augmented reality, update user information based on non-purchase.

12. The method according to claim 11, further comprising applying one or more artificial intelligence (AI) or machine learning (ML) based on whether the purchase was made at the retailer for provisioning of future rebate offerings via augmented reality.

13. The method according to claim 1, wherein the displayed image information is a map.

14. The method according to claim 1, wherein the displayed image information is an image of one or more retailers corresponding to the one or more rebates.

15. The method according to claim 1, wherein the displayed image information is an image of an area including one or more retailers corresponding to the one or more rebates.

16. The method according to claim 1, further comprising:
displaying product offerings provided by a retailer corresponding to the one or more rebates.

17. The method according to claim 1, further comprising:
displaying a review for a retailer corresponding to the one or more rebates.

18. A system to perform dynamic provisioning of augmented reality information, the system comprising:
a user device of a user; and
a server including at least a memory and a processor, wherein the processor is configured to:
acquire, from the user device, user device-based information;
retrieve rebate information corresponding to the user device-based information;
retrieve user information of the user of the user device;
track a movement and activity of the user device, wherein the activity of the user device includes performance of a certain physical act tracked using an accelerometer included in the user device, and wherein the tracking of the movement of the user device includes tracking a location of the user device along a certain path using a global positioning system (GPS) information of the user device;
determine whether a predetermined condition is met;
when the predetermined condition is determined to have been met, display one or more rebates in augmented reality over image information displayed on a display of the user device;
when the predetermined condition is determined not to have been met, continue to track the movement and activity of the user device until the predetermined condition is determined to be met;
display a moving virtual character in a holograph format corresponding to the one or more rebates, wherein the moving virtual character runs towards a physical retailer location corresponding to the one or more rebates; and
based on the movement and activity of the user device, remove from the display of the user device, at least one rebate corresponding to at least one retailer while additional augmented reality information corresponding another retailer is displayed.

19. A non-transitory computer readable storage medium that stores a computer program for performing dynamic provisioning of augmented reality information, the computer program, when executed by a processor, perform a process comprising:

acquiring, from a user device of a user, user device-based information;
retrieving corresponding rebate information;
retrieving user information;
tracking a movement and activity of the user device, wherein the activity of the user device includes performance of a certain physical act tracked using an accelerometer included in the user device, and wherein the tracking of the movement of the user device includes tracking a location of the user device along a certain path using a global positioning system (GPS) information of the user device;
determining whether a predetermined condition is met;
when the predetermined condition is determined to have been met, displaying one or more rebates in augmented reality over a displayed image information;
when the predetermined condition is determined not to have been met, continue the tracking of the movement and activity of the user device until the predetermined condition is determined to be met;
displaying a moving virtual character in a holograph format corresponding to the one or more rebates, wherein the moving virtual character runs towards a physical retailer location corresponding to the one or more rebates; and
based on the movement and activity of the user device, removing from the display of the user device, at least one rebate corresponding to at least one retailer while additional augmented reality information corresponding another retailer is displayed.

* * * * *